United States Patent
Kay

(10) Patent No.: US 7,131,142 B1
(45) Date of Patent: Oct. 31, 2006

(54) INTELLIGENT AGENTS USED TO PROVIDE AGENT COMMUNITY SECURITY

(75) Inventor: Paul S. Kay, Santee, CA (US)

(73) Assignee: NCR Corp., Dayton, OH (US)

( * ) Notice: Subject to any disclaimer, the term of this patent is extended or adjusted under 35 U.S.C. 154(b) by 886 days.

(21) Appl. No.: 09/715,130

(22) Filed: Nov. 20, 2000

(51) Int. Cl.
*H04L 9/00* (2006.01)

(52) U.S. Cl. .......................... 726/23; 726/22; 713/182

(58) Field of Classification Search ............... 703/200, 703/201, 167; 726/23
See application file for complete search history.

(56) References Cited

U.S. PATENT DOCUMENTS

| | | | | |
|---|---|---|---|---|
| 4,562,436 | A | * 12/1985 | Coleman et al. | 340/825 |
| 5,842,125 | A | * 11/1998 | Modzelesky et al. | 455/426.1 |
| 5,867,501 | A | * 2/1999 | Horst et al. | 370/474 |
| 6,315,200 | B1 | * 11/2001 | Silverbrook et al. | 235/454 |
| 6,324,647 | B1 | * 11/2001 | Bowman-Amuah | 726/23 |
| 6,389,538 | B1 | * 5/2002 | Gruse et al. | 713/194 |
| 6,427,140 | B1 | * 7/2002 | Ginter et al. | 705/80 |

OTHER PUBLICATIONS

Qi He, Katia P. Sycara, Timothy W. Finin; Personal Security Agent: KQML-Based PKI; International Conference on Autonomous Agents; pp. 377-384; Year of Publication: 1998.*
Antonio Puliafito, Orazio Tomarchio; Security mechanisms for the MAP agent system; Parallel and Distributed Processing, 2000. Proceedings. 8th Euromicro Workshop on , Jan. 19-21, 2000 ☐☐pp. 84-91.*

* cited by examiner

*Primary Examiner*—Kambiz Zand
(74) *Attorney, Agent, or Firm*—Lowe Hauptman Gilman Berner, LLP; James M. Stover

(57) ABSTRACT

A method and apparatus for using security agents to perform security-related functions in an agent community is described. More particularly, security agents are used to monitor and police an agent community for abnormal actions of agents within an agent community and to detect and police non-approved agents within the community. The security agents include a configuration, a distribution, a secure copy, and a patrol agent.

10 Claims, 4 Drawing Sheets

INTELLIGENT AGENTS USED TO PROVIDE AGENT COMMUNITY SECURITY

TECHNICAL FIELD

The present invention relates generally to a method and apparatus for providing security for an agent community and, more particularly, to such a method and apparatus including an investigative mode for determining the origination and intent of a rogue or mole agent. Further, the present invention relates to a method and apparatus for monitoring and policing an agent community to detect and/or prevent abnormal actions or non-approved agents within the community.

BACKGROUND ART

Software agents are known in the art. Software agents are independent, executable, software generally designed for a single function. An agent community is a collection of agents for performing a single task or multiple tasks. The agent community may be resident and executing on a single computer or the agent community may be distributed and executing on a network of multiple computers.

Agents are software entities displaying the traits of cooperation, learning and autonomy to various degrees. Agents use standard languages and protocols to reach common goals through collaborative cooperation, learn from experience and observation, adapt to their environment, and act on their own to pursue their own agendas. Some typical attributes of agents include adaptability, ability to communicate knowledge, persistence, inferential capability, personality (predictable behavior characteristics), and mobility. Some agents are able to travel from system to system to complete a specified task. Mobile agents are able to carry their data and execution context along with them as they travel between communities. Agents may display some or all of these attributes, as well as other possible attributes not included in this list.

When an agent community is built using known software tools, there is a possibility of invasion or inclusion of "rogue agents" or "mole agents." Rogue agents are agents whose purpose is to spy on or disrupt the agent community. Mole agents are agents whose purpose is to spy on the agent community and collect and provide information from within the community to a person, agent, or organization outside the agent community.

During the community building process, an infiltration, either physical or electronic, may be used by unscrupulous individuals to insert or add rogue or mole agents to a community. These agents may then disrupt the operation of the community or they may simply spy on and report information about the community to outside the community.

After the community is built, the possibility of outside infiltration of rogue agents remains. If there are no security controls or agents in place, a rogue agent may be added to the community from outside the community once the community is built and executed. Because of agent mobility or the ability to migrate between communities, it is possible for a rogue agent to migrate from one agent community to another agent community by posing as an authorized agent in the community.

Communities are typically "trusting" software, assuming that new agents connecting or migrating are trustworthy by knowing the protocol. The intent is to make expansion of the communities easy by making it easy to add or replace agents.

Previous approaches have included active human monitoring and intervention in the execution of the agent community. A human operator would be required to monitor the agent community and detect abnormal operations being performed by agents in the community. Additionally, the human operator must monitor agent migrations between communities. Upon detection of a rogue or mole agent, the human operator would then actively initiate security measures, such as isolation, continued monitoring, misdirection, and unauthorized agent termination. By requiring a human presence to perform security functions, the agent community efficiency and speed is decreased and expense is increased. Therefore, there is a need in the art to perform security-related functions in an agent community using security agents without requiring human intervention. More specifically, there is a need in the art for a special set of agents to monitor and police an agent community for abnormal actions or unauthorized agents within the community.

DISCLOSURE OF THE INVENTION

Accordingly, it is an object of the present invention to use security agents to perform security-related functions in an agent community.

It is another object of the present invention to use security agents to monitor and police an agent community for abnormal actions of agents within an agent community.

It is another object of the present invention to use security agents to detect and police unauthorized agents within the community.

It is another object of the present invention to use security agents to perform security-related functions in an agent community without requiring human intervention.

The present invention provides a method and apparatus for using security agents to perform security-related functions in an agent community. More particularly, security agents are used to monitor and police an agent community for abnormal actions of agents within an agent community and to detect and police non-approved or unauthorized agents within the community.

These and other objects of the present invention are achieved by a computer implemented method of securing an agent community. A set of interdependent security agents are deployed within an agent community and the agent community security is then managed using the security agents. The security agents may include a configuration agent, a distribution agent, a secure copy agent, and a patrol agent. By using security agents to manage security in the community, greater efficiency is achieved by the community. Advantageously, the security agents are used to detect, monitor, and police unauthorized agents within the community. Further, there is a reduction in the burden on a human operator to monitor the security of the community. In an alternate embodiment, at least one security agent is deployed within an agent community to manage the community security.

In a computer system aspect, the present invention includes a processor for receiving and transmitting data and a memory coupled to the processor having agent information and sequences of instructions for execution by the processor. When executed by the processor, the sequences of instructions cause the processor to deploy a set of interdependent security agents within an agent community, and to manage the agent community security using the security agents.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
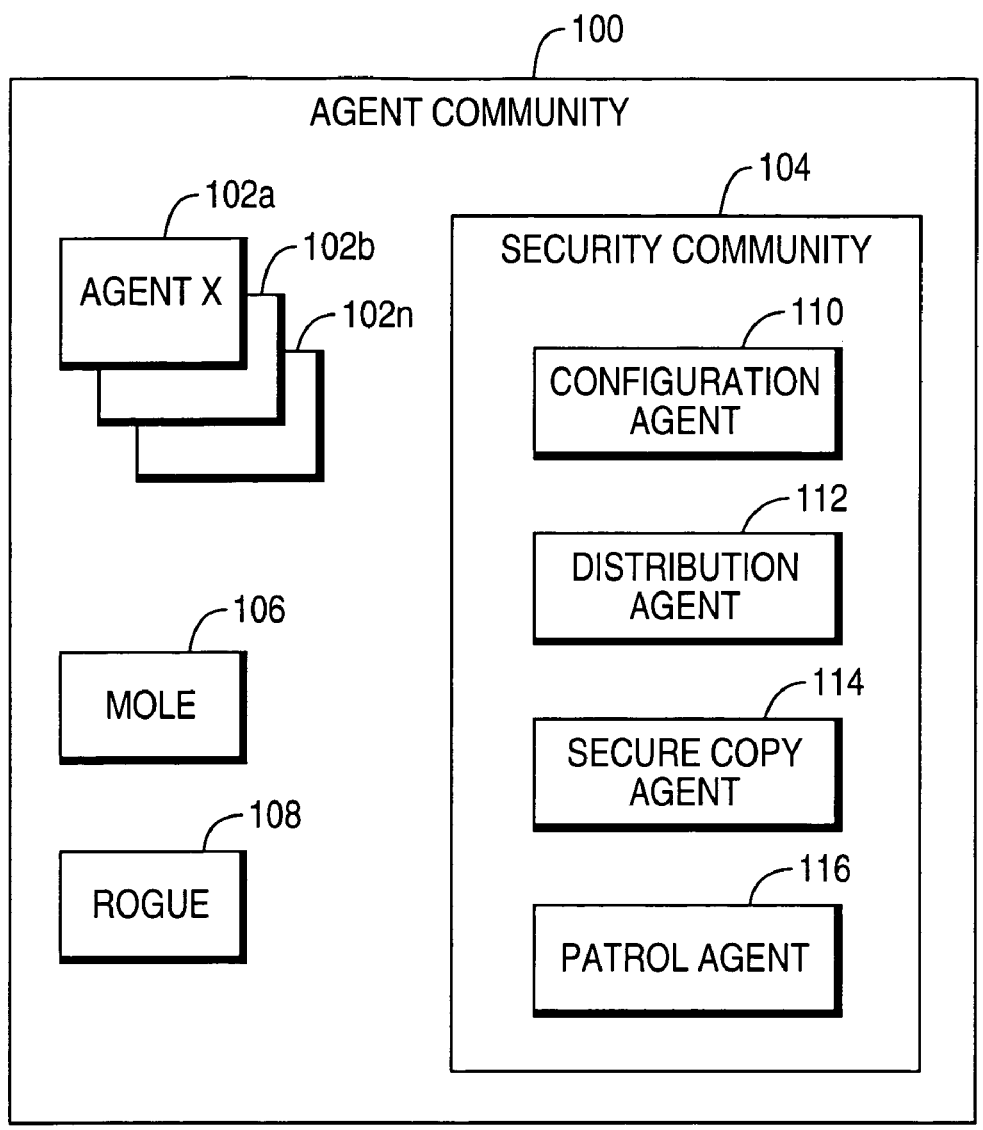
FIG. 1 is a high level functional block diagram of a logical architecture according to an embodiment of the present invention.

An agent community 100 includes multiple agents 102a–102n operating together to complete a single task or multiple tasks, e.g., mining databases for information, scheduling meetings, executing diagnostics at network nodes, routing electronic mail according to specified rules. The agent community 100 further includes a security community 104 to provide security-related functions by monitoring and policing agents 102a–102n and additional agents migrating into community 100.

The security, or police, community 104 is a set of interdependent agents within the agent community 100. The security community 104 is useful in applications such as monitoring and policing a marketing domain, privacy community, or an e-commerce community. The security community 104, in such applications, is used to ensure compliance with security rules and policies within the community-at-large. For example, the security community 104 would be relied upon to prevent a mole agent 106 from releasing confidential marketing information to individuals outside the community 100. Additionally, the security community 104 is responsible for detecting, controlling, and in many cases terminating, a rogue agent 108. Rogue agent 108 may be designed to destroy agents in the community 100 or simply be disruptive by deleting or rearranging community information. The security community 104 is designed to identify and handle unauthorized agents using several different types of security agents.

A first type of agent in the security community 104, i.e., a configuration agent 110, works with the existing configuration tools (e.g., specifying the agents allowed to execute in the community, specifying the host computers on which the agents are to begin execution) of the community 100 to provide a hidden password capability. A security token, based on the system, agent and an administrator password, is created for each agent by the configuration agent 110. The data is secured in the same way as the UNIX shadow password file is implemented. Typically, there is a single configuration agent 110 per computer.

The configuration agent 110 is responsible for the creation of new agents, migration of agents from one community to another, and stopping agent execution.

A second agent, i.e., a distribution agent 112, distributes information throughout the community 100. The distribution agent 112 works in conjunction with the configuration agent 110, described above, and the secure copy agent 114, described below, to distribute agents and agent information between agents and communities of agents. The distribution agent 112 informs the configuration agent 110 of migrating agents and uses services provided by the secure copy agent 114 to migrate an agent to or from an agent community.

A third agent, i.e., a secure copy agent 114, provides a secure copy facility. When contacted with a request from a user or human operator, another community, or another agent to load a new agent, the secure copy agent 114 also requires a correct security token be delivered from the configuration agent 110. If the token is correct, the copy is performed.

A fourth agent, i.e., a patrol agent 116, patrols the community 100. The patrol agent 116, in alternate embodiments, may be mobile and patrol multiple communities. On receipt of a new agent connecting to the community 100, a "copy and activate agent" request for the current host, or if time has elapsed, the patrol agent 116 inventories the local host for active agents. The patrol agent 116 compares this list to the current configuration list maintained by the configuration agent 110. If an agent is part of the community 100, but not part of the configuration, the patrol agent 116 performs an action. If an agent is part of the community 100 and part of the configuration, but the specifics of the agent do not match, i.e., wrong size, the patrol agent 116 performs an action, as described below, e.g., advising a user or isolating the unauthorized agent. If an agent is attempting to migrate, but is neither part of the configuration nor matching any specifics provided by the configuration agent 110, the patrol agent 116 performs an action.

Upon detection of an unauthorized agent, e.g., either mole agent 106 or rogue agent 108, the patrol agent 116 gathers all available information on the unauthorized agent, e.g., location, size, start time, creation time, owner, etc, and performs an action depending on the patrol agent security mode. There are four security modes of the patrol agent 116 selectable by an administrator or user: passive, advisory, strict, and investigatory.

It is to be understood that the patrol agent security modes are not mutually exclusive and that in different embodiments a patrol agent may transition between modes depending on the circumstances of the situation.

In the passive or do nothing mode, the patrol agent 116 takes no action to detect or monitor unauthorized agents.

With the patrol agent 116 in advisory mode, the patrol agent 116 informs the administrator of possible unauthorized agents. The advisory mode allows the patrol agent 116 to report on occurrences in case a procedural error occurred which needs to be corrected.

In the strict mode, the patrol agent 116 deletes possible unauthorized agents and informs the administrator. In this mode, the patrol agent 116 goal is to save the community first and inform the administrator afterward in case a procedural error occurred requiring system recovery.

The goal of the patrol agent 116 in investigatory mode is to isolate the unauthorized agent, if possible; otherwise, the patrol agent 116 deletes or disables the unauthorized agent. In either situation, the patrol agent 116 alerts the administrator as in strict mode.

Isolation of the unauthorized agent may include several optional sub-modes. If the unauthorized agent is on a policed system, i.e., a computer having an agent community including a security community, and in the same user group, i.e., in a file permission sense, the patrol agent 116 uses a standard operating system interface, i.e., a debugger interface such as the /proc filesystem on a Unix-based operating system, to determine the information received or viewed by and sent from the unauthorized agent and redirects the information to the patrol agent 116. When operating to isolate an unauthorized agent in this mode, the patrol agent 116 may be referred to as a controller or interrogation agent and in alternate embodiments there may be a separate controller agent for fulfilling this role in the security community 104. Information received by the unauthorized agent is referred to as subscribed information and information sent is referred to as published information.

If the unauthorized agent is not on a policed system or not of the same user group, the patrol agent 116 redirects the backbone or network connection of the unauthorized agent. The patrol agent 116 provides the user with the records to which the unauthorized agent has subscribed. A particularly useful functionality as used against a mole agent 106, the patrol agent 116 may also provide a mechanism for the user to feed false information to the unauthorized agent, thus doubling the mole agent 106 for community security use to obtain information about the agent's origin and purpose. In this manner, the administrator may then use the mole agent 106 to discern useful information about the person or organization who inserted the mole agent 106.

Figure 2:
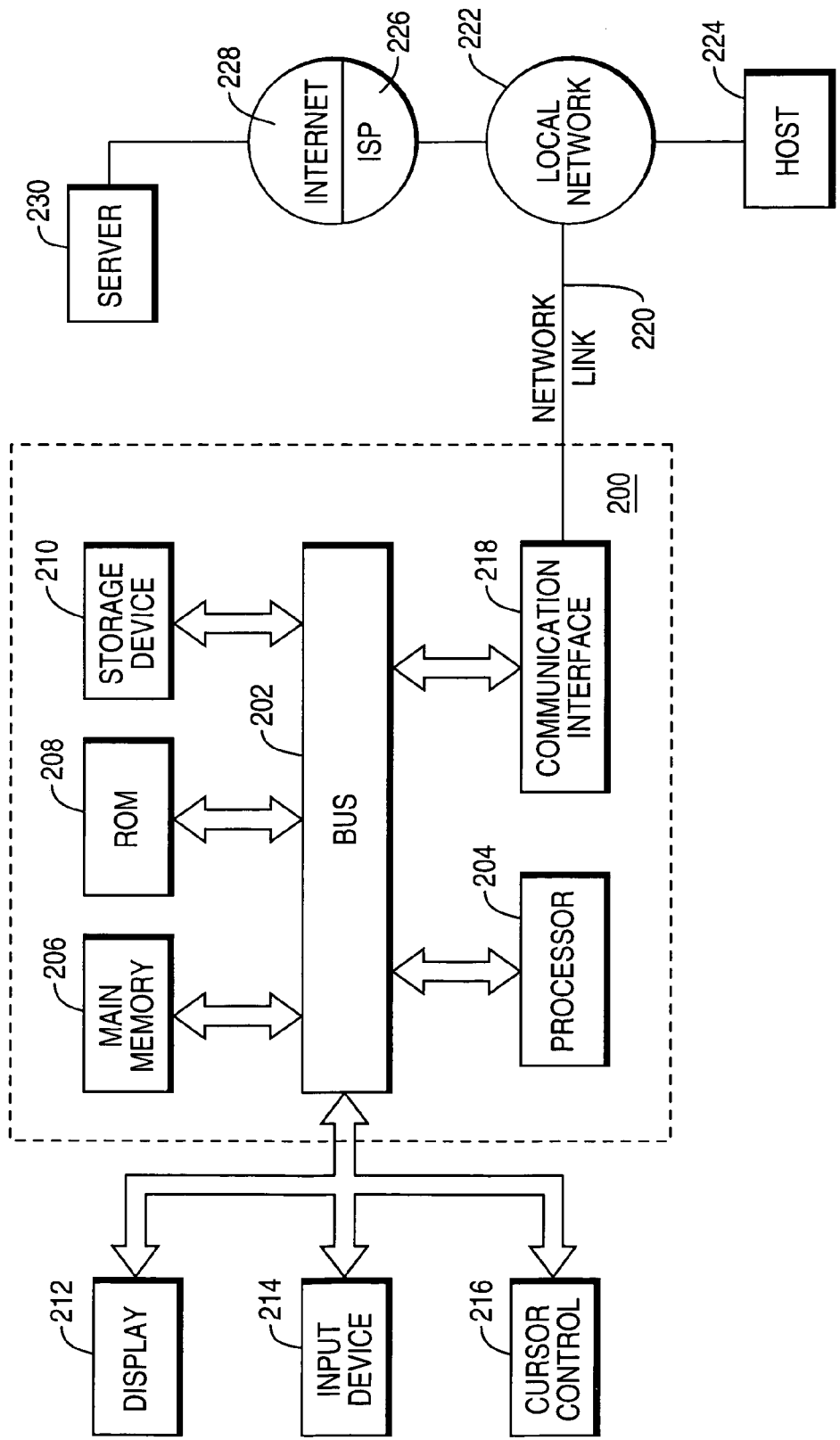
FIG. 2 a high level block diagram of a computer usable with the present invention.

FIG. 2 is a block diagram illustrating an exemplary computer system 200 upon which an embodiment of the security community of the present invention may be implemented. The present invention is usable with currently available personal computers, mini-mainframes and the like.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing security-related information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Computer system 200 may be coupled via the bus 202 to a display 212, such as a cathode ray tube (CRT) or a flat panel display, or to control panel C1 of Figure C for displaying information to a user. An input device 214, including alphanumeric and function keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of a computer system 200, such as the illustrated system of FIG. 2, to control the light output level of a fixture or a network of fixtures, such as fixture D1 of Figure D. According to one embodiment of the invention, the light output level of fixture D1 is controlled by computer system 200 in response to processor 204 executing sequences of instructions contained in main memory 206 and determining that the light output level is to be increased or decreased. Such instructions may be read into main memory 206 from another computer-readable medium, such as storage device 210.

However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 200 also includes a communication interface 218 coupled to the bus 202. Communication interface 208 provides a two-way data communication as is known. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of agent and security-related information. For example, two or more computer systems 200 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 200, are exemplary forms of carrier waves transporting the information.

Computer system 200 can send messages and receive data, including program or agent code, through the network(s), network link 220 and communication interface 218. In the Internet example, a server 230 might transmit a requested code for an application program or agent migration or execution through Internet 228, ISP 226, local network 222 and communication interface 218. In accordance with the invention, one such downloaded application provides for monitoring and policing an agent community to detect and/or prevent abnormal actions or non-approved agents within the community. Additionally, the security community and/or security-related information may be modified by a host 224 or server 230 using network link 220.

The received code may be executed by processor 204 as it is received, and/or stored in storage device 210, or other non-volatile storage for later execution. In this manner, computer system 200 may obtain application code in the form of a carrier wave.

Figure 3:
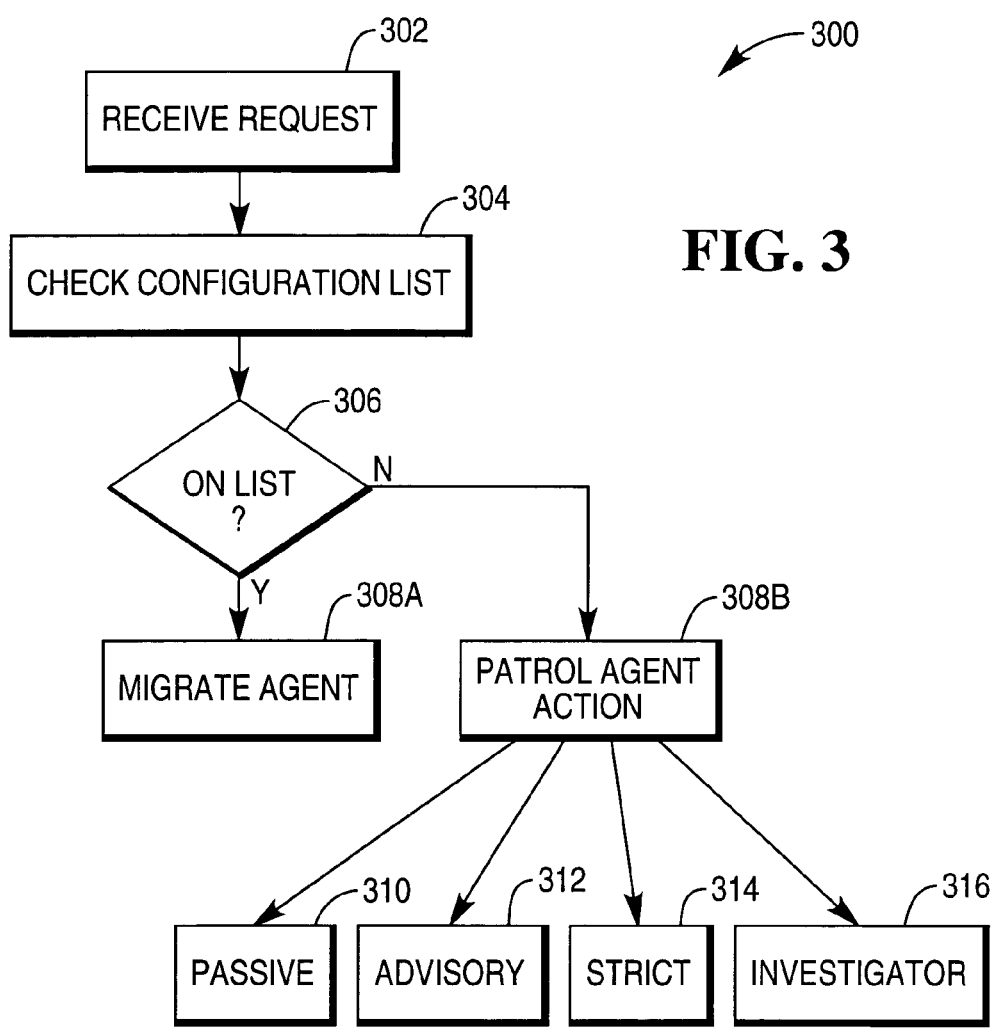
FIG. 3 is a high level flow diagram of an example of an agent migration as in an embodiment of the present invention.

An example is helpful to illustrate the operation of the present invention. Because agents may migrate between communities, it is necessary to check migrating agents to determine if they are unauthorized agents. In the example shown in the program flow 300 of the flow chart of FIG. 3, a mole agent 106 attempts to migrate from another community to agent community 100 and report information back to an individual or organization outside the community 100.

At step 302, a request is received at agent community 100 to migrate a new agent into agent community 100. The agent migration request is referred to security community 104, and in particular, to patrol agent 116.

Upon receiving the request, the patrol agent 116 checks with the configuration agent 110 at step 304 to determine if the migrating agent is on the configuration list. The configuration agent 110 checks the configuration list for the migrating agent information. If the migrating agent is on the configuration list, the configuration agent 110 informs the patrol agent 116 that the migrating agent is on the list at step 306A.

Unless there are additional checks to be performed, the patrol agent 116 at step 308A permits the migration of the agent into the community. Additional checks to be performed may include a name, size, or cyclic redundancy (CRC) checks similar to checks performed on non-migrating agents depending on the community configuration, i.e., if the configuration agent specifies name checking, then only names are checked on agents. The patrol agent 116 directs the distribution agent 112 and secure copy agent 114 to migrate the agent into the community 100.

If the migrating agent is not on the configuration list, the configuration agent 110 informs the patrol agent 116 at step 306B. The program flow proceeds to step 308B. If the migrating agent is not on the configuration list, then depending on the patrol agent mode, the patrol agent takes a particular action. Depending on the patrol agent 116 configuration, the program flow proceeds to either a passive mode of step 310, an advisory mode of step 312, a strict mode of step 314, and an investigatory mode of step 316. Depending on the patrol agent mode 310–316, the patrol agent may do nothing, alert a human operator to the presence of the unauthorized agent, prevent the migrating agent from migrating by not invoking the distribution or secure copy agents and informing a human operator, or allow the agent to migrate, but isolate the migrating agent from the rest of the community 100.

Further, by isolating the migrating agent, the patrol agent 116 is able to coopt the migrating agent. In this manner, the patrol agent 116, and ultimately the human operator, may be able to provide false information to the migrating agent in order to obtain information about the individual or organization that created or was using the migrating agent. In effect, the migrating agent can be doubled and used by the security community 104.

Figure 4:
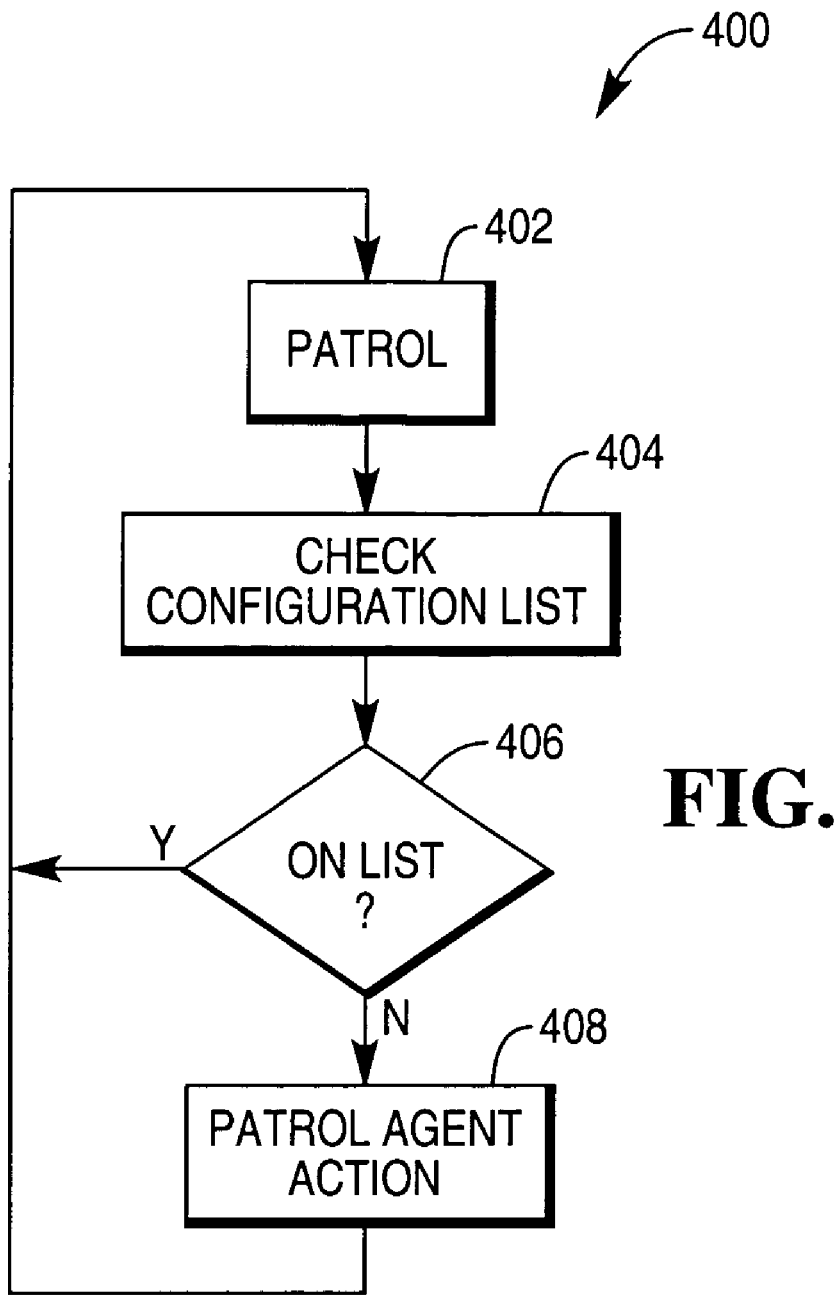
FIG. 4 is a high level flow diagram of an example of a patrol agent patrolling as in an embodiment of the present invention.

An example of the detection and isolation of a rogue agent is helpful to further illustrate the operation of the present invention. Because agents might infiltrate into a community, it is necessary to periodically check agents to determine if they are unauthorized agents. In the example shown in the program flow 400 of the flow chart of FIG. 4, a mole agent 106 is in agent community 100 and reporting information back to an individual or organization outside the community 100.

The patrol agent 116 is continually monitoring, at step 402, the agents 102a–102n in community 100. As part of agent monitoring, the patrol agent 116 inventories the agents in the community 100. As the agents are inventoried, the program flow proceeds to step 404 and checks with the configuration agent 110 to determine if the inventoried agents are on the configuration list for the community 100. The configuration agent 110 checks the inventoried agent, as described above, and replies to the patrol agent at step 406A, if the agent is on the configuration list, and at step 406B, if the agent is not on the configuration list.

Unless additional checks are to be performed, the patrol agent 116 proceeds to continue patrolling the agent community 100 and the program flow proceeds to step 402.

If the inventoried agent is not on the configuration list, the configuration agent 1110 informs the patrol agent 116 at step 406B. The program flow proceeds to step 408 and if the inventoried agent is not on the configuration list, then depending on the patrol agent mode, the patrol agent 116 takes a particular action, as described in conjunction with the previous example. Upon completion of the patrol agent action, the program flow returns to step 402.

Advantageously, the present invention uses security agents to perform security-related functions in an agent community. The security agents monitor, detect, and police unauthorized agents within an agent community.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof. For example, although only a single configuration, distribution, secure copy, and patrol agent have been described, it is to be understood that more than one of each may be present in a given security community.

What is claimed is:

1. A computer implemented method of securing an agent community, comprising the steps of:

deploying a set of interdependent security agents within an agent community, the set of interdependent security agents including a configuration agent, a distribution agent, a secure copy agent, and a patrol agent; and managing the agent community security using the security agents, wherein said step of managing the agent community comprises:

deploying said configuration agent to create a security token for each agent within said agent community and to maintain a configuration list identifying agents within the agent community;

deploying said distribution agent to inform said configuration agent of agents migrating to or from said agent community;

deploying said secure copy agent to require a correct security token to be delivered from the configuration agent to permit the addition of a new agent to said agent community; and deploying a patrol agent to identifying unauthorized agents which are agents that are not identified on said configuration list and to advise a user upon identification of an unauthorized agent.

2. The method as claimed in claim 1, wherein the patrol agent has modes of operation including at least one of a passive, advisory, strict, and investigatory mode.

3. The method as claimed in claim 2, wherein a patrol agent in investigatory mode isolates an unauthorized agent.

4. The method as claimed in claim 2, wherein a patrol agent in investigatory mode doubles an unauthorized agent.

5. The method as claimed in claim 1, further comprising the step of:

migrating at least one security agent to another agent community.

6. A computer system for securing an agent community comprising:

a processor for receiving and transmitting data; and a memory coupled to the processor, the memory having stored therein agent information and sequences of instructions which, when executed by the processor, cause the processor to deploy a set of interdependent security agents within an agent community, and manage the agent community security using the security agents, the set of interdependent security agents including:

a configuration agent for creating a security token for each agent within said agent community and maintaining a configuration list identifying agents within the agent community;

a distribution agent for informing said configuration agent of agents migrating to or from said agent community;

a secure copy agent requiring a correct security token to be delivered from the configuration agent to permit the addition of a new agent to said agent community; and a patrol agent for identifying agents which are not identified on said configuration list and advising a user upon identification of an agent which is not identified on said configuration list.

7. The system as claimed in claim 6, wherein the patrol agent has modes of operation including at least one of a passive, advisory, strict, and investigatory mode.

8. The system as claimed in claim 7, wherein the patrol agent in investigatory mode isolates an unauthorized agent.

9. The system as claimed in claim 7, wherein the patrol agent in investigatory mode doubles an unauthorized agent.

10. The system as claimed in claim 6, further including sequences of instructions which, when executed by the processor, cause the processor to migrate at least one security agent to another processor.

* * * * *